United States Patent [19]
Allison

[11] Patent Number: 5,628,940
[45] Date of Patent: May 13, 1997

[54] PROCESS FOR APPLYING LOW-CEMENT CASTABLE REFRACTORY MATERIAL

[75] Inventor: Eric L. Allison, Portsmouth, Ohio

[73] Assignees: Reno & Son, Inc.; Oak Mountain Industries, Inc., both of Morris, Ala.

[21] Appl. No.: 273,457

[22] Filed: Jul. 11, 1994

[51] Int. Cl.$^6$ .............................. B05D 1/02; B32B 35/00; C21B 7/06; F27D 1/16
[52] U.S. Cl. .................. 264/30; 264/35; 264/36; 266/281; 427/426; 427/427
[58] Field of Search ...................... 264/30, 35, 36, 264/309; 425/11, 12, 13; 427/427, 426; 266/281; 156/94

[56] References Cited

U.S. PATENT DOCUMENTS

| | | | |
|---|---|---|---|
| 2,516,892 | 8/1950 | Lobaugh | 264/304 X |
| 3,035,940 | 5/1962 | Hobson | 427/426 |
| 3,197,315 | 7/1965 | Jacobs et al. | 264/30 X |
| 3,330,890 | 7/1967 | Holt et al. | 264/30 |
| 3,333,840 | 8/1967 | Weaver et al. | 264/30 |
| 3,912,838 | 10/1975 | Kraus et al. | 427/426 |
| 4,421,797 | 12/1983 | Koehne | 427/426 X |
| 4,442,219 | 4/1984 | TenEyck et al. | 264/30 X |
| 4,623,393 | 11/1986 | Toda et al. | |
| 4,708,745 | 11/1987 | Schönhausen | 427/427 X |
| 4,779,798 | 10/1988 | Natolino et al. | 266/281 X |
| 4,804,563 | 2/1989 | Hillemeier et al. | 427/427 X |
| 4,880,211 | 11/1989 | Head et al. | 266/281 X |
| 4,904,503 | 2/1990 | Hilton et al. | 427/427 X |
| 4,981,731 | 1/1991 | Yorita et al. | 427/427 X |
| 5,340,612 | 8/1994 | Perito | 427/427 X |

OTHER PUBLICATIONS

"Shotcrete" published by Allentown Pneumatic Gun; date & author unknown; See particularly p. 6.
"Shotcrete for Ground Support", American Concrete Institute SP–54, Detroit, MI 1977, p. 59.
"Shotcreting", American Concrete Institute SP–14, Detroit, MI, 1966, pp. 59–74 and 139–154.
"Refractory Concrete", American Concrete Institute SP–57, Detroit, MI, 1978, p. 232.
Resco Vibrocast 50G data sheet dated Jan. 1993.
Resco Ahlstrom LCG data sheet dated Jul. 1992.
"Guide to Shotcrete", American Concrete Institute Committee 506R–90, 1985 revised for updated references 1990, Detroit, MI.
"High–Alumina Cements and Concretes", T.D. Robson, John Wiley & Sons Inc., New York, 1962, pp. 125–129.
"The Chemistry of Cement and Concrete", F.M. Lea, Chemical Publishing Company, Inc., New York, 1971, p. 511.
"Refractory Concrete", American Concrete Institute Committee 547R–79 (Revised 1983), Detroit, MI, pp. 57, 74–77.
Secar 71 Calcium Aluminate Cement data sheet, Lafarge Calcium Aluminates, 1986.
"Refractory Gunning Equipment and Accessories", 1977 Annual Convention, American Concrete Institute, San Diego, Mar. 13–18, 1977, pp. 13–14.
"Standards Classification of Alumina and Alumina–Silicate Castable Refractories", ASTM C401.91, Jul. 1991.

*Primary Examiner*—Karen Aftergut
*Attorney, Agent, or Firm*—Veal & Associates

[57] ABSTRACT

A method for placing a thixotropic low-cement castable refractory material without the necessity for forms. A low-cement castable material is mixed with a measured amount of water, then is pumped hydraulically through a hose to a nozzle assembly. Compressed air and a cement setting agent are added to the mixture at the nozzle. The addition of the setting agent at the nozzle overcomes the thixotropic nature of the low-cement castable, so that it will immediately "set" in position when sprayed onto a surface, including vertical and overhead surfaces.

12 Claims, 1 Drawing Sheet

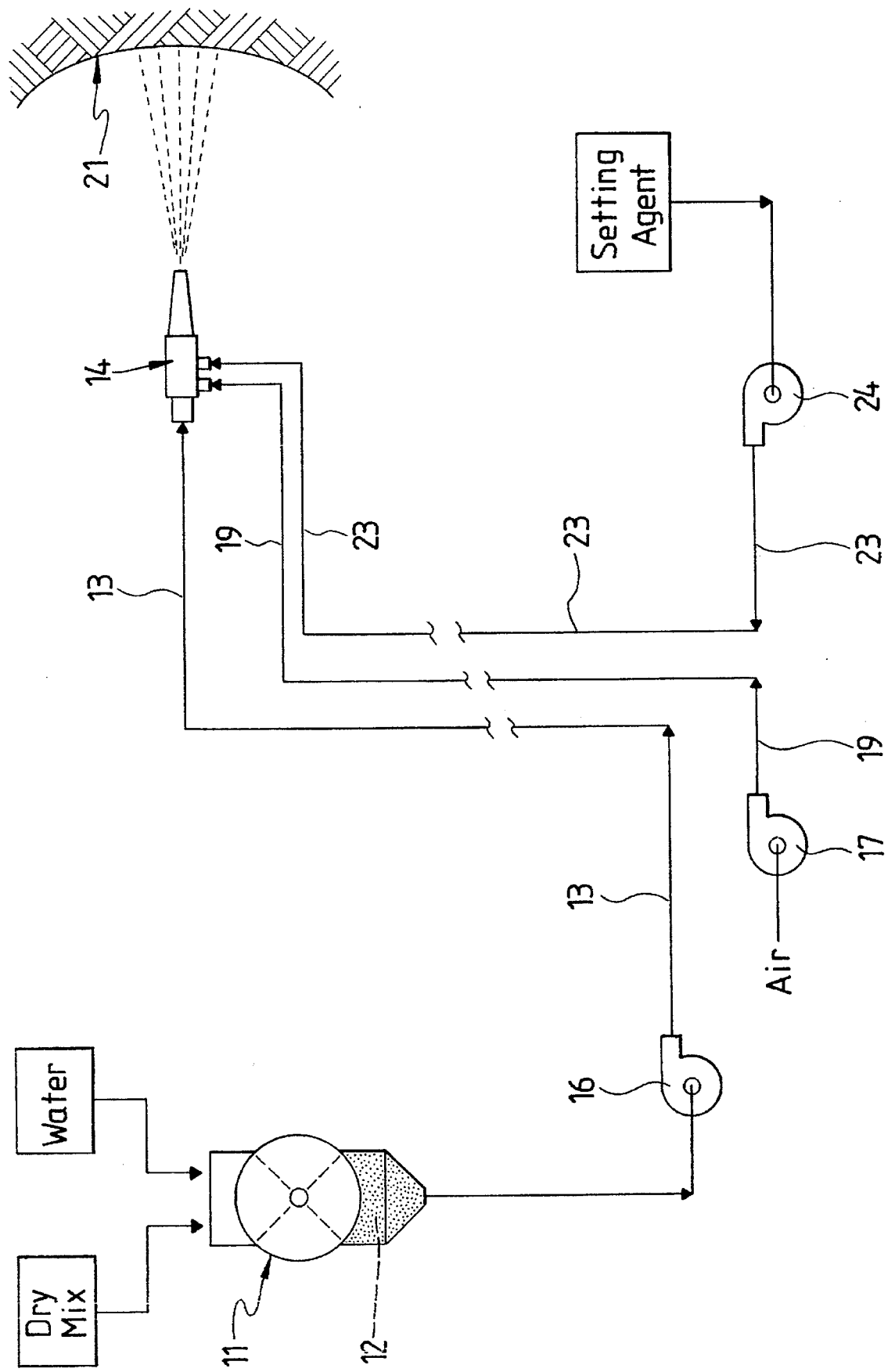

PROCESS FOR APPLYING LOW-CEMENT CASTABLE REFRACTORY MATERIAL

FIELD OF THE INVENTION

The present invention relates to refractory installation. More particularly, the present invention relates to the installation of low-cement refractory material. Even more particularly, the present invention relates to the installation of low-cement refractory material without the necessity for forming and casting. In even greater particularity, the present invention relates to a process for applying low-cement castable refractory material using a spray nozzle.

BACKGROUND OF THE INVENTION

Castable refractory materials are generally divided into two categories: conventional and low-cement. These castables are used in any applications requiring a durable lining capable of withstanding extremely high temperatures, for example, in the interior of furnaces and the ladles used in transferring molten iron during the steel manufacturing process. In general, a conventional castable material contains approximately 10% to 30% by weight of cement. A low-cement castable refractory material contains less than approximately 10% by weight of cement. Conventional castables may be applied in a number of ways: (1) by using forms to mold the conventional castable material and removing the forms after the material has set; (2) by a "dry method" of spray application, referred to in the trade as "gunnite"; and (3) by a "wet method" of spray application.

Of the three methods, forming and casting is the least desirable because of the greatly increased labor costs associated with building the forms. Additionally, some applications do not lend themselves to forming. For example, the ladles used in the steel mills to transport molten iron are roughly football-shaped. Building forms to accommodate the interior of the ladle would be impracticable.

The gunnite method of application consists of pneumatically conveying a dry refractory gunning mix into a compressed air stream and forcing it through a hose to a nozzle, adding water through a line at the nozzle and spraying the moistened mix onto the surface to be lined. Although gunnite eliminates the cost of forming and allows application to any surface regardless of shape or irregularities, it too suffers from a number of disadvantages. First, the quality of the finished product is largely dependent on the skill of the nozzle operator. The operator must constantly control the flow of water to properly hydrate the dry mix. Sufficient water must be added to hydrate the cement in the mix, or the mixture will not properly adhere to the surface. The addition of too much water, however, weakens the compressive strength of the final product. Secondly, gunnite requires the use of a high volume of compressed air at the rate of approximately 250 to 700 cubic feet per minute. Because of the lack of thorough mixing, coarse aggregates contained in the gunning mix "rebound" from the surface. The amount of rebound material may be as high as one-third of the dry material passing through the gun. In addition to creating another factor that the nozzle operator must consider in controlling the amount of water added, the rebound of aggregates creates both a clean-up problem and an occupational safety issue. The high amount of dust generated during the gunnite process mandates that operators wear masks and respirators to avoid aspirating dust particles.

The wet method of spraying refractory material into place consists of pre-mixing dry refractory material with a measured amount of water, hydraulically conveying the pre-mixed material to a nozzle and spraying the material onto the surface to be lined. Since the material is pre-mixed with a measured amount of water, the nozzle operator is relieved of the task of controlling the amount of water added. The refractory material is typically mixed in a paddle mixer for several minutes, ensuring that the cement in the mix is thoroughly and uniformly wet. The wet method eliminates the problems of rebound and dust; the nozzle operator may accordingly work without a respirator. Additionally, the air volume required to place the material is approximately 80–90 cubic feet per minute, substantially less than that required in the gunnite process.

Low-cement castable refractory materials have properties far superior to conventional castables. Conventional castables form an end product having higher porosity than those formed with low-cement castables. In the steel mill applications, the higher porosity allows slag and molten iron a more effective surface to react with, thereby accelerating the degradation of the refractory. As the bond deteriorates, the refractory material loses its strength. The retained strength of low-cement refractory material is accordingly greater than that of conventional castables. Standard strength tests conducted by the applicant on a 60% alumina conventional castable and a 60% alumina low-cement castable yielded the following results:

| Pre-fired to °F. | Low-cement Modulus of Rupture, psi | Conventional Modulus of Rupture, psi | Low-cement Cold Crushing Strength, psi | Conventional Cold Crushing Strength, psi |
| --- | --- | --- | --- | --- |
| 250 | 1260 | 1100 | 5360 | 4400 |
| 1500 | 2900 | 800 | 10900 | 4700 |
| 2000 | 2350 | 1100 | 9000 | 4000 |
| 2500 | 2800 | 1800 | 9700 | 6700 |
| 3000 | 3860 | 2000 | 12000 | 7200 |

Although low-cement castables have physical properties that are superior to conventional castables, their use has been limited by a number of factors. First, because of the small amount of cement in the castable material, it must be pre-mixed with a measured amount of water for several minutes to activate the low-cement system. Additionally, the amount of water added to the low-cement castable material must be carefully controlled, as an excess of water will weaken the final refractory product. Since the "gunnite" method of application does not allow for mixing, and since the nozzle operator is required to determine the amount of water to add during the actual application, the dry method of spray application does not lend itself to use with a low-cement castable. Use of low-cement castables has been further limited by the fact that a low-cement castable is "thixotropic," i.e., it tends to flow when high shear energy is applied. Because of this property, low-cement castables previously could be placed only by forming and casting. Attempts to apply low-cement castables with a spray gun were unsuccessful, as the refractory material would flow off a vertical, semi-vertical or overhead surface. The inability to prevent the low-cement castable from running off of the surface resulted in limiting the use of low-cement castables to those applications in which forms could be used to cast the material. Applications in which forming was not feasible were limited to the gunning of conventional castables.

SUMMARY OF THE PRESENT INVENTION

With the foregoing in mind, the principal object of the present invention is to provide a method of placing low-cement refractory castable materials without the necessity for forms.

Another object of the present invention is to provide a method for placing low-cement refractory castables on a surface regardless of shape or irregularities.

Still another object of the present invention is to provide a method for placing low-cement castables that is less expensive than traditional methods.

These and other objects of the present invention are accomplished by a method which includes pre-mixing the dry low-cement castable material with a measured amount of water, hydraulically conveying the mixed material through a hose or pipe to a nozzle, adding an accelerator at the nozzle that will cause immediate hydrate precipitation and spraying the mixture onto the surface to be lined.

BRIEF DESCRIPTION OF THE FIGURE

The FIGURE illustrates the inventive method and apparatus.

DETAILED DESCRIPTION OF THE PREFERRED EMBODIMENT

In the preferred embodiment, a slurry of hydrated lime is added to a low-cement refractory mixture at the nozzle as it is sprayed onto a surface. The hydrated lime reacts with the low-cement mixture and causes it to stiffen immediately, thereby eliminating the need for forming and casting.

A low-cement castable material is placed in a mixer 11 with a premeasured amount of water and mixed to achieve the proper consistency. The wet cementitious mixture 12 is conveyed hydraulically through a hose 13 to a nozzle assembly 14, using a suitable pump 16. An air compressor 17 feeds compressed air through an air hose 19 into the nozzle assembly 14 at a rate of approximately 80–90 cubic feet per minute, to allow the mixture to be sprayed onto a surface 21. A setting agent, hydrated lime, is added to the mixture at the nozzle 14 through a setting agent hose 23. The optimum amount of dry hydrated lime used to keep the low-cement mixture from flowing off of the surface is between 0.01% and 5.0% of the dry weight of the low-cement castable material. Addition of amounts of hydrated lime in excess of 5.0% will still cause the low-cement material to "freeze" upon contact with the surface upon which it is directed, but is less desirable because it will decrease the refractoriness of the final product. The hydrated lime can be delivered to the nozzle in liquid form in a mixture of 50% water and 50% hydrated lime by weight, using a liquid metering pump 24. Alternatively, dry lime may be metered directly into the air hose 19 at a point between the air compressor 17 and the nozzle assemble 14.

The major constituent of the cement used in most refractory castables is "monocalcium aluminate." The addition of lime to a low-cement refractory mixture including an amount of monocalcium aluminate causes the mixture to immediately set, because the lime combines with the monocalcium aluminate to cause immediate hydrate precipitation. When anhydrous calcium aluminate is placed in water, lime and alumina dissolve. The addition of free lime (calcium oxide) increases the calcium to alumina ratio, thereby reducing the period required for the formation of calcium aluminate hydrates to the point that precipitation is immediate. The hydrate precipitation causes a "gelling" effect in the cement, reversing the thixotropic tendency of the low-cement castable, and allowing the material to remain in place when it reaches the intended surface.

Although the invention has been disclosed through the description of an embodiment using hydrated lime as the setting agent, the addition of any cement setting agent that will cause an exothermic chemical reaction when combined with the low-cement castable material that results in the required calcium aluminate hydrate precipitation, may be used in place of hydrated lime. Those agents containing alkali, for example, sodium or potassium, are less desirable because they promote "fluxing," i.e., chemical reactions between the refractory material and molten slag or impurities produced during furnace operation, and decrease the serviceable temperature of the refractory product. Additionally, the introduction of excess water weakens the refractory product; accelerators such as clay or methyl cellulose are accordingly less desirable though they enable spray application of low-cement refractory material.

While I have shown my invention in a single form, it will be obvious to those skilled in the art that it is not so limited but is susceptible of various changes and modifications without departing from the spirit thereof.

Having set forth the nature of the present invention, what is claimed is:

1. A method for placing low-cement castable refractory material on a surface without the use of forms, comprising the steps of:
    (a) mixing dry low-cement castable refractory material with water until it forms a thoroughly and uniformly wet, thixotropic, low-cement castable mix of a hydraulically pumpable consistency;
    (b) hydraulically pumping said wet, thixotropic, low-cement castable mix through a hose to a nozzle;
    (c) metering an amount of a cement-setting agent to be added to said wet, thixotropic, low-cement castable mix to induce substantially instantaneous setting of said wet, thixotropic, low-cement castable mix upon contact on a surface;
    (d) introducing air and said metered amount of said cement-setting agent into said wet, thixotropic, low-cement castable mix at said nozzle, forming a low-cement castable end mix having diminished thixotropic properties; and
    (e) spraying said low-cement castable end mix having diminished thixotropic properties onto said surface without the use of forms until a desired thickness of said low-cement castable end mix is reached, wherein said low-cement castable end mix substantially instantaneously sets upon contact with said surface.

2. A method as defined in claim 1, wherein said low-cement castable refractory material contains an amount of monocalcium aluminate cement.

3. A method as defined in claim 2, wherein a chemical composition of said cement-setting agent is such that its combination with said low-cement castable refractory material causes an exothermic reaction and results in substantially instantaneous calcium aluminate hydrate precipitation.

4. A method as defined in claim 1, wherein said cement-setting agent is hydrated lime and wherein said amount of hydrated lime to be added is 0.01% to 5.0% by dry weight of said dry low-cement castable refractory material.

5. A method as defined in claim 4, wherein said hydrated lime is dry and wherein movement of said air, as it is introduced into said wet, thixotropic, low-cement castable mix, creates an airstream and wherein said introduction of said dry lime further comprises placing said amount of dry lime into said airstream before said air reaches said nozzle.

6. A method as defined in claim 4, further comprising the step of mixing said amount of hydrated lime with water to form a slurry prior to introducing said hydrated lime into said wet, thixotropic, low-cement castable mix at said nozzle.

7. A method for applying a low-cement castable refractory material on a vertical or overhead surface without the use of a form, wherein a hose and nozzle are used to deliver said low-cement castable refractory material proximal said surface, comprising the steps of:

(a) mixing a composition of low-cement refractory material with a quantity of water to ensure that said cement therein is thoroughly and uniformly wet such that a thixotropic, hydraulically pumpable, wet, low-cement refractory mixture is formed;

(b) hydraulically pumping said thixotropic, low-cement refractory mixture through said hose to said nozzle;

(c) forming a slurry of a cement setting agent and water; and (d) introducing air and said slurry into said thixotropic, low-cement refractory mixture at said nozzle, such that said slurry and thixotropic, low-cement refractory mixture are dispersed by said nozzle as a spray of a low-cement castable end mix having diminished thixotropic properties such that said low-cement castable end mix is deposited on said surface without the use of a form and without substantial gravity shearing from said surface due to substantially instantaneous setting of said low-cement castable end mix.

8. A method as defined in claim 7, wherein said cement setting agent comprises hydrated lime.

9. A method as defined in claim 8, wherein an amount of said hydrated lime to be added to said water to form said slurry is between 0.01% to 5.0% by dry weight of said low-cement refractory material.

10. A method of applying a low-cement refractory material to a surface without the use of forms, comprising, in combination, the steps of:

(a) in a mixer, mixing a low-cement refractory material, said refractory material including a low-cement system having a calcium aluminate based cement therein, with a quantity of water for a period of time sufficient to activate said low-cement system and to ensure that said cement therein is thoroughly and uniformly wet, such that a thixotropic, hydraulically pumpable, wet cementitious mixture is formed in said mixer;

(b) hydraulically pumping said wet cementitious mixture through a conduit to a spray nozzle;

(c) introducing a quantity of air to said spray nozzle concomitantly with said pumped wet cementitious mixture to create forces to spray said wet cementitious mixture from said nozzle onto said surface without the use of forms; and (d) introducing a free lime setting agent into said nozzle such that said free lime increases a calcium to alumina ratio in said wet cementitious mixture to effect immediate hydrate precipitation, thereby reversing said thixotropic nature of said wet cementitious mixture as it passes through said nozzle during said spray application to said surface.

11. A method as defined in claim 10, further comprising the step of mixing said free lime with water to form a slurry prior to introducing said free lime into said nozzle.

12. A method as defined in claim 10, wherein said free lime setting agent is 0.01 to 5.0% by dry weight of said low-cement refractory material.

* * * * *